United States Patent [19]

Felleman

[11] Patent Number: 6,097,503
[45] Date of Patent: Aug. 1, 2000

[54] BI-LEVEL TO CONTONE DATA CONVERSION

[75] Inventor: John P. Felleman, Mercer Island, Wash.

[73] Assignee: Adobe Systems Incorporated, San Jose, Calif.

[21] Appl. No.: 09/012,340

[22] Filed: Jan. 23, 1998

[51] Int. Cl.[7] .................................................. G06K 15/00
[52] U.S. Cl. ............................................. 358/1.9; 358/1.1
[58] Field of Search ...................................... 347/188, 212, 347/254; 358/518–523, 444, 445, 448, 296, 450–453, 1.1, 1.2, 1.9, 1.16, 1.18; 382/254, 162, 107, 284; 395/101, 102, 109, 115, 117

[56] References Cited

U.S. PATENT DOCUMENTS

| 4,959,790 | 9/1990 | Morgan | 395/109 |
| 5,387,985 | 2/1995 | Loce et al. | 358/447 |
| 5,687,300 | 11/1997 | Cooper | 395/109 |

FOREIGN PATENT DOCUMENTS

| 0 207 548 | 1/1987 | European Pat. Off. . |
| 0 301 786 | 2/1989 | European Pat. Off. . |
| 92 12594 | 7/1992 | WIPO . |

OTHER PUBLICATIONS

Daun, S., CIP3 Print Production Format Information Material, *Fraunhofer Institute for Computer Graphics*, version 1.0, Sep. 6, 1995.
Daun et al., Digital Document Production, date unknown.
Daun et al., Specification of the CIP3 Print Production Format, *Fraunhofer Institute for Computer Graphics*, version 2.1, May 27, 1997.
Lucas et al., Format, date unknown.
CIP3 Print Production Format (PPF)—workflow doesn't stop at prepress!, date unknown.

*Primary Examiner*—Arthur G. Evans
*Attorney, Agent, or Firm*—Fish & Richardson P.C.

[57] ABSTRACT

A look-up table of ink density values corresponding to a predetermined number of printed bit patterns is used to convert a high resolution bi-level data file into a lower resolution contone data file. A method to convert bi-level data to contone data includes reading a specified number of words from the bi-level data and retrieving, for each word, an ink density value from the look-up table using the word as an index into the table.

32 Claims, 5 Drawing Sheets

BI-LEVEL TO CONTONE DATA CONVERSION

BACKGROUND OF THE INVENTION

The present invention relates to printing systems and, more specifically, to converting high resolution bi-level data to a lower resolution contone format for initializing ink key values in a press system.

Referring to FIG. 1, a traditional print work flow can be characterized as a three phase process. In the first or "prepress" phase (100 through 114), creation of the print product and printing plates are the central focus. In the second or "print" phase (116 and 118), the printing press is adjusted for operation and the information is printed. In the third or "postpress" phase (118 and 120), the generated product is cut, folded, and bound.

Creation of the print product (step 100) can be accomplished using any convenient tool for the acquisition or creation of text, images, and line-art. The resulting product is generally represented in an output-device independent language known as a page description language (PDL) and stored in a computer readable file 102. Well known PDLs include the POSTSCRIPT and PORTABLE DOCUMENT FORMAT languages. POSTSCRIPT is a trademark of Adobe Systems, Incorporated.

Once created, the PDL file 102 is executed by a raster image processor (step 104) to generate one or more high resolution bi-level data files 106. For example, if the target press is a CMYK device, a single high resolution data file 106 including bi-level image data for each of the device's colorants—cyan (C), magenta (M), yellow (Y), and key (K) or black—is generated. Alternatively, four high resolution data files can be generated, one for each device colorant. High resolution data files 106 typically have a resolution of between approximately 1,000 dpi (dots per inch) and 5,000 dpi.

High resolution data files are used to generate (step 108) a series of printing plates 110. A plate is often referred to as a signature and can be used to image a number of different pages. A single signature can be used, for example, to produce 4, 8, 12, or 16 pages of output, where the number of pages correspond to a single sheet of paper (or other equivalent output media). High resolution data files 106 are also used as input to a process to generate (step 112) a print control file 114. The print control file 114 is in a form suitable to control the inking and other print control parameters of a printing press. One standardized format is the Print Product Format (PPF), developed by the International Cooperation for Integration of Prepress, Press, and Postpress (CIP3) organization.

Referring to FIG. 2A, a typical offset press system 200 includes a number of ink keys 202 (only one shown), a plate cylinder 204 which carries a signature, a blanket cylinder 206 which transfers the plate cylinder's 204 ink to the paper 208, and an impression cylinder 210 to provide a hard transfer surface for the paper 208. FIG. 2B shows a face-on view of the plate cylinder 202 with a single ink key 200. Area 212 represents the circumferential band on the plate cylinder 202 that receives ink from key 200 and corresponds, by way of the blanket cylinder 206, to a band of ink on the printed paper. A typical plate cylinder 202 can be between 12 inches and 40 inches long and have between 2 and 4 ink keys 200 per inch. Thus, each ink key can correspond to a region of between one-quarter to one-half inches on an output page 208.

One task of the print control file 114 is to provide the necessary information so that a press 200 can compute a proper setting for each one of its ink keys (an ink key preset value). What constitutes a "proper level" is a function of several variables including the percentage of a key's band 212 on the signature covered by ink, and the frequency of the input data 100 corresponding to that band. As defined in the CIP3 PPF, the print control file 114 includes a print control section and a preview image section. The preview image section consists of low resolution contone data for each press colorant/plate. It is this low resolution contone data which is used by a press 200 to compute ink key preset values. One conventional method to compute ink key preset values is to rasterize the PDL input file 102 directly to contone data and then average, over a region determined by the resolution of the output device (i.e., the area under a single ink key 200), the resulting pixel values. Another method to compute ink key preset values is to count the average number of "on" bits in a region, the size of which is again determined by the resolution of the output device, of the high resolution data file 106 to generate the low resolution contone data. The former approach can require significant additional processing and is insensitive to input data 100 line frequency. The latter is totally insensitive to line frequency.

SUMMARY OF THE INVENTION

Generally, the invention provides apparatus and methods to convert a high resolution bi-level data file into a lower resolution contone data file through the use of a table look-up technique. In one embodiment, the look-up table has a predetermined number of unique bit patterns and the same number of ink density values. Each ink density value is associated with one of the bit patterns and represents the measured ink density of a printed version of the bit pattern. In another embodiment, a method to convert bi-level data to contone data includes reading a specified number of words from the bi-level data and retrieving, for each word, an ink density value from a look-up table using the word as an index into the table.

Conversion in this manner accounts for high resolution data line and pixel frequencies, is very fast, and generates accurate ink key preset values which can significantly reduce a print job's make-ready time. Other features and advantages of the invention will become apparent from the following detailed description and from the claims.

DETAILED DESCRIPTION OF THE INVENTION

An empirical analysis of the high resolution bi-level data file and a print system specific look-up table can generate low resolution contone pixel values very quickly, uses only a small amount of memory, accounts for high resolution data line and pixel frequencies, generates accurate ink key preset values and, as a result, can significantly reduce a print job's make-ready time. The inventive technique will be described in terms of specific examples which are illustrative of the invention and are not to be construed as limiting.

Figure 1:
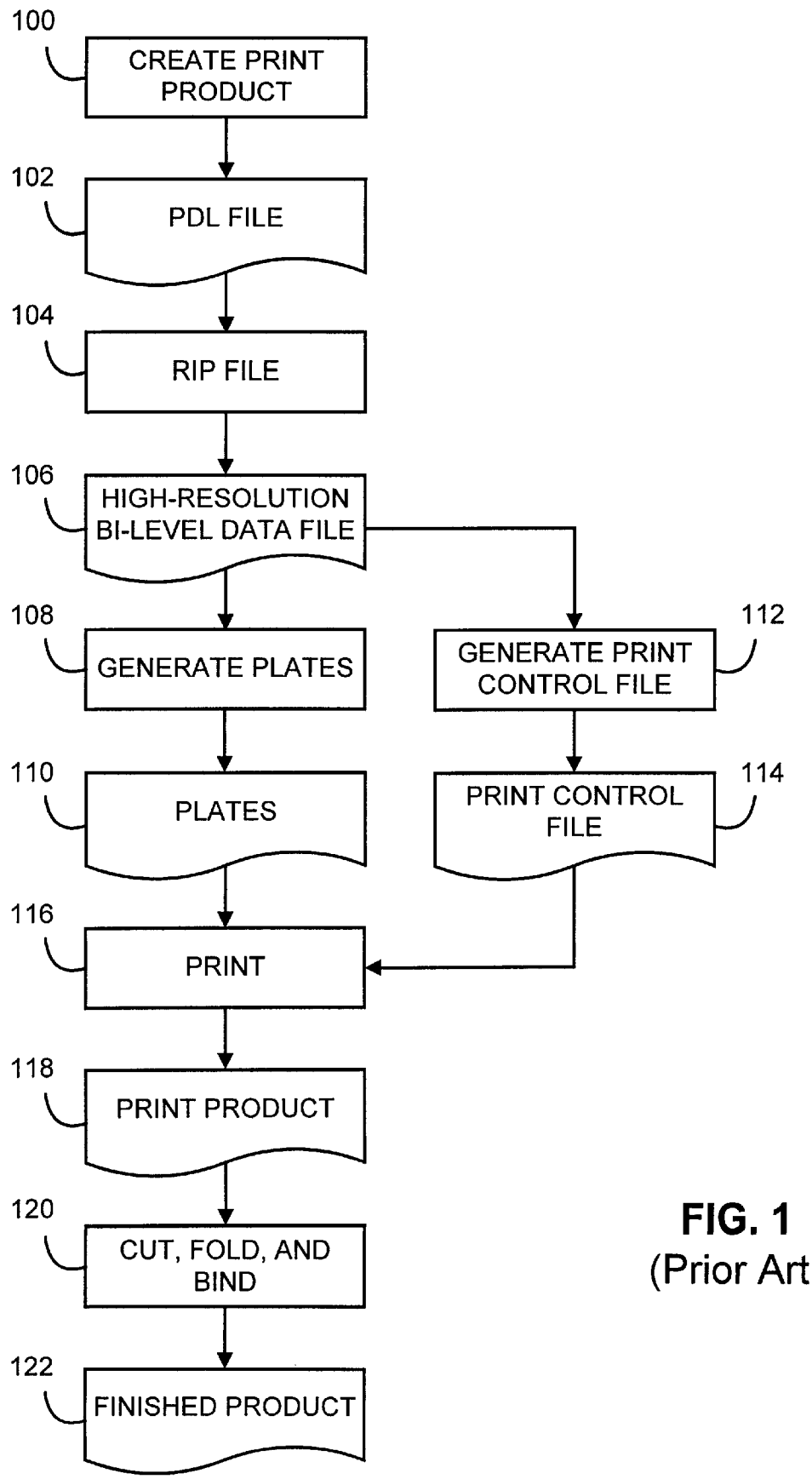
FIG. 1 shows a traditional print work flow.
Figure 2A:
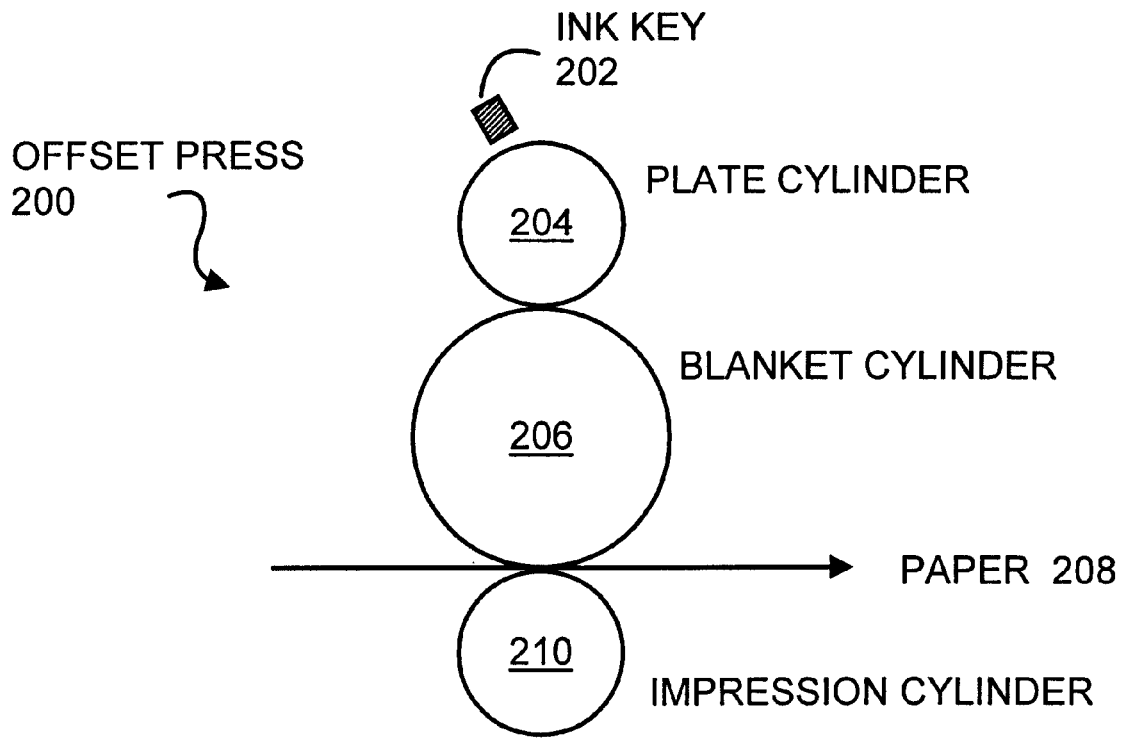
FIGS. 2A and 2B illustrate certain aspects of an off-set press.
Figure 2B:
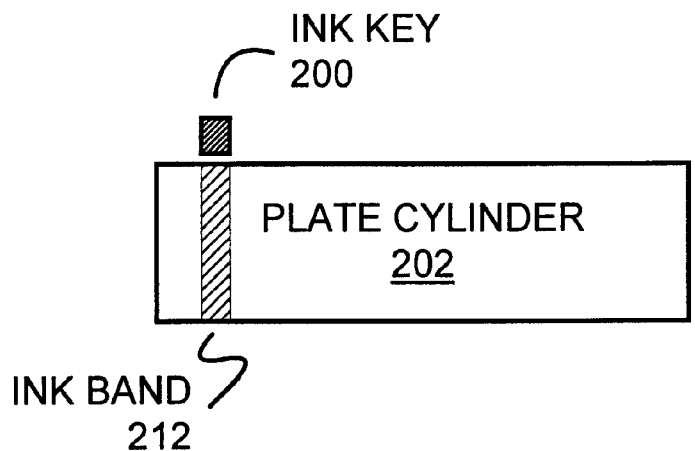
Figure 3:
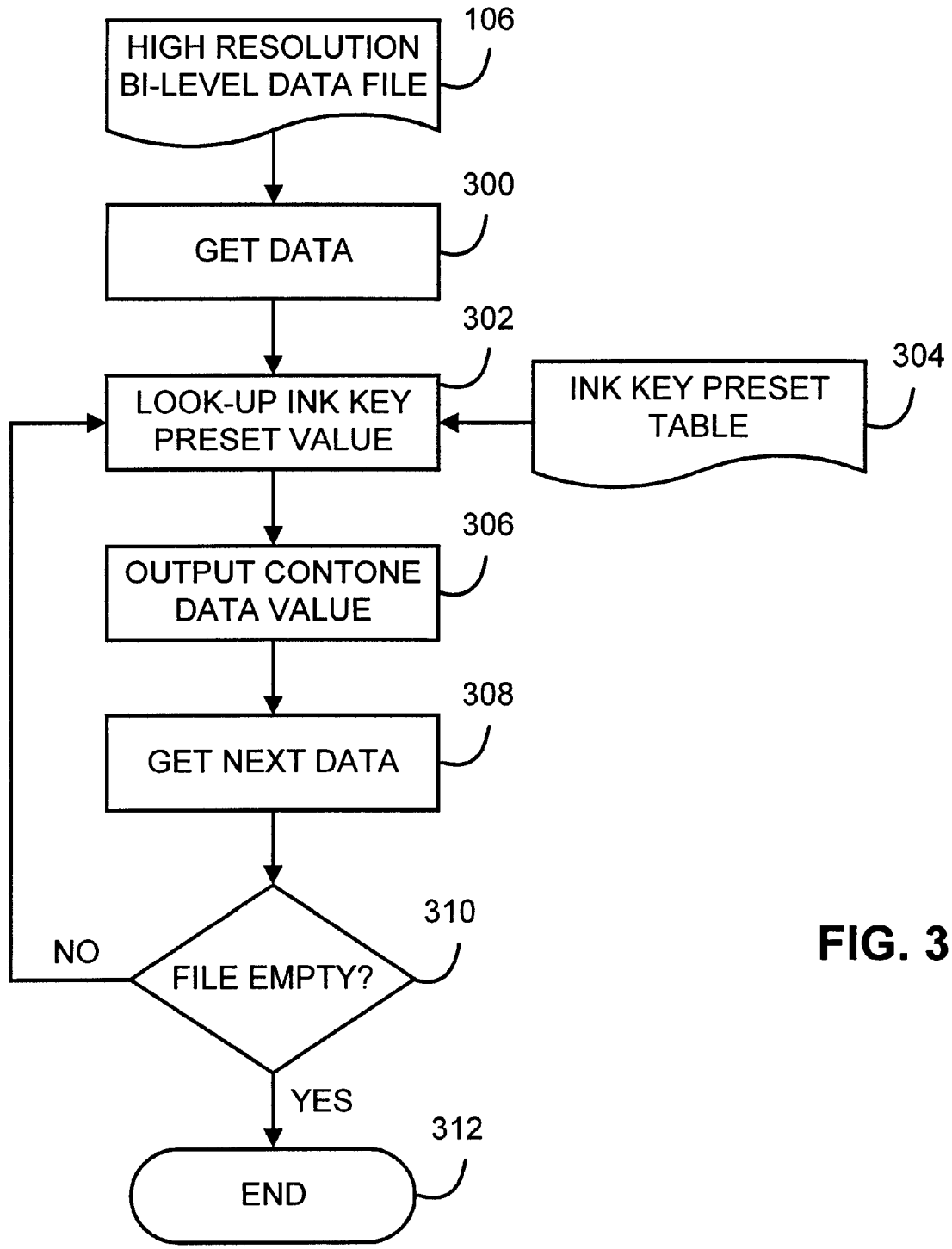
FIG. 3 illustrates a high resolution to low resolution conversion process.

Referring to FIG. 3, contone data generation begins by obtaining a data value (step 300) from a high resolution bi-level data file 106. This value is used to look-up a preset value (step 302) from an ink key preset table 304. The preset value obtained in step 302 represents the high resolution data's contone data value. The contone data value can be written, or stored, to an output file (step 306) and the next high resolution data value is retrieved (step 308). If the high resolution data file 106 is empty (the 'yes' prong of step 310), contone data generation is complete and the process terminates at step 312. If the high resolution data file 106 is not empty (the 'no' prong of step 310), contone data generation continues as step 302.

Figures 4, 5:
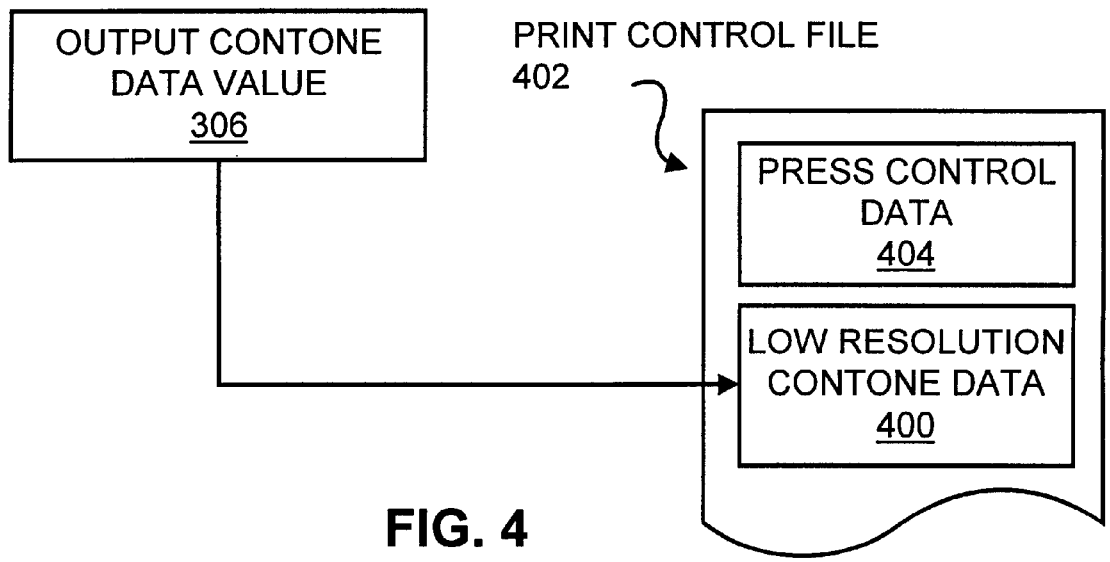
FIG. 4 shows a print control file including a low resolution contone data section.
FIG. 5 shows an ink key preset table.

Referring now to FIG. 4, contone data values can be output (step 306 of FIG. 3) to the low resolution contone data segment 400 of a print control file 402. As discussed previously, a print control file 402 can also include press control data 404 in accordance with, for example, the CIP3's PPF specification.

In one embodiment, a number of high resolution data values (e.g., values returned by steps 300 or 308 of FIG. 3) are used to generate a number of contone data values (step 302) which are then combined to generate a single, composite, contone data value. One method of combining different contone data values is to calculate the mean (average) of the individual contone data values.

As shown in FIG. 5, an ink key preset table 304 can include $2^n$ entries, where each entry is composed of two parts: an index or address part 500, and a contone value part 502. An index value 500 is a numeric label associated with a contone value. In a simple case, an index value is the numeric equivalent of an n-bit binary pattern. Thus, if high resolution bi-level data is read n-bits at a time, the n-bit pattern is interpreted as an index value 500 into the ink key preset table 304 and is used to retrieve a contone value 502 representative of that high resolution data pattern.

The specific contone values 502 stored in the ink key preset table 302 are generated by an empirical analysis of the target press system's print characteristics. First, each of the $2^n$ possible bit patterns, corresponding to the n-bit indices 500, are physically printed to paper on the target press system. Next, a measurement is made of the resulting ink density by, for example, a densitometer. The value so obtained is normalized to a value between zero and ($2^n-1$) and stored in the ink-key table at a location associated with the corresponding n-bit pattern. Contone values generated in this manner do not have to be compensated for ink dot gain and may be applied directly to control a press' ink keys.

In a preferred embodiment, 'M' n-bit patterns are read from the high resolution bi-level data file to generate M contone values (e.g., steps 302 through 310 of FIG. 3 are repeated M times). These M contone values are averaged to produce a composite contone value, and the composite contone value is written (stored) in a print control file's 402 low resolution contone data section 400. The value of M depends upon the resolution difference between the high resolution bi-level data file and the desired resolution of the low resolution contone data.

Figure 6:
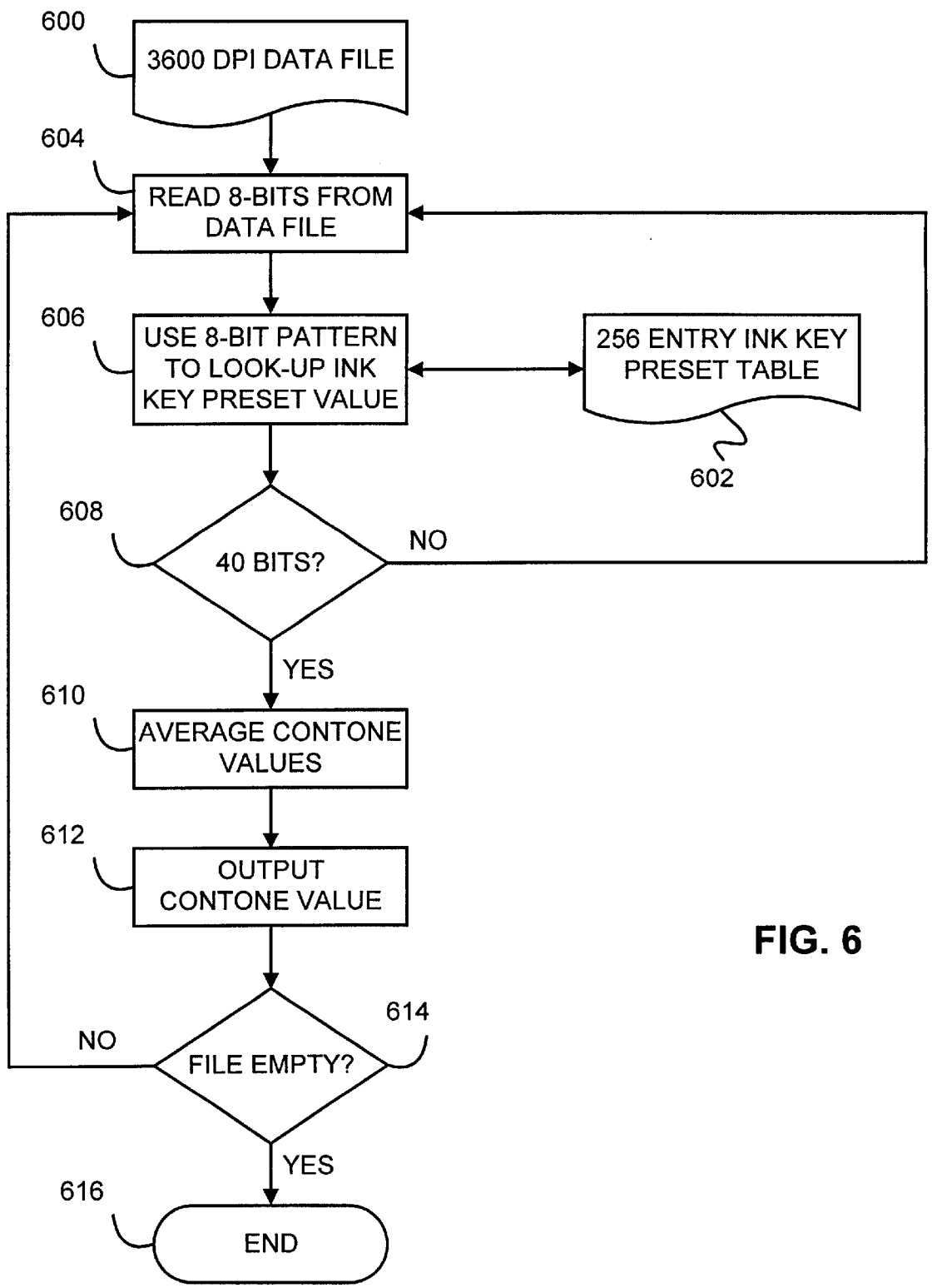
FIG. 6 illustrates conversion of a 3600 dots per inch (dpi) resolution bi-level data file into a 90 dpi contone data file.

By way of example, see FIG. 6, if a high resolution bi-level data file 602 has a resolution of 3600 dpi, and it is desired that the low resolution contone data be 90 dpi, then each block of 40 bits in the high resolution data file are converted into a single contone pixel value. If the contone data is 8-bits deep (i.e., represented by an 8-bit value), then 'n' is conveniently chosen as eight. The ink key preset table 602 is generated by printing, on the target press system, each of the 256 possible 8-bit patterns and measuring the resulting ink densities. The measured values are normalized to a value between 0 and 255 and stored in the ink key preset table 602 at a location corresponding to the value's associated bit pattern. Because 40 bits of the high resolution data file 600 are being converted into a single 8-bit contone pixel value, M is set equal to 5. Thus, five 8-bit patterns are read from the high level bi-level data file to generate a single 8-bit contone value (steps 604 through 608). After each 40 bit block has been converted, the five (M) contone values are averaged (step 610) and output (step 612) to a low resolution contone data file such as, for example, the contone data section of a print control file (see FIG. 4). The process repeats (step 614) until all of the input data file 600 has been converted.

Conversion of high resolution bi-level data to low resolution contone data in this manner accounts for high resolution data line and pixel frequencies, is very fast while consuming only a relatively small amount of memory, and generates accurate ink key preset values which can significantly reduce a print job's make-ready time. It will be recognized that modifications to the specific example describe above may be made without departing from the inventive concept. For example, the number of entries in an ink key preset table does not have to be an even multiple of two. Likewise, the number of bits read from a high resolution bi-level data file does not need to be eight. It is recognized that there is a trade-off between the value of 'n', the size of the ink key preset table, and the speed of converting a high resolution bi-level data file into a low resolution contone data file. For example, the larger the value of 'n', the larger the ink key preset table, and the faster (generally) the conversion process.

The invention may be implemented in digital electronic circuitry or in computer hardware, firmware, software, or in combinations of them. For example, the invention may be implemented, at least in part, as a computer program tangibly embodied in a machine-readable storage device for execution by a computer processor. Method steps according to the invention may be performed by a computer processor executing instructions organized, e.g., into program modules to operate on input data and to generate output. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially-designed application-specific integrated circuits (ASICs).

What is claimed is:

1. A method for converting bi-level data to contone data for use in creating a printed sheet, comprising:
   receiving bi-level data;
   reading a specified number of words from the bi-level data, each word having a predetermined number of bits;
   obtaining, for each word, a corresponding predetermined ink density value; and
   generating a contone data value for the specified number of words from the specified corresponding predetermined ink density values.

2. The method of claim 1, wherein obtaining a corresponding predetermined ink density value comprises obtaining the value from a table using the corresponding word of bi-level data as an index into the table.

3. The method of claim 2, wherein the table includes a predetermined number of unique bit patterns and a same number of ink density values, each ink density value associated with one of the unique bit patterns and representing a measured ink density of a printed version of the one of the unique bit patterns.

4. The method of claim 3, wherein each one of the predetermined number of unique bit patterns is associated with exactly one of the ink density values.

5. The method of claim 3, wherein the measured ink density is generated by a densitometer.

6. The method of claim 3, wherein the predetermined number of unique bit patterns is $2^n$, where n is the number of bits in a word of bi-level data.

7. The method of claim 6, wherein n is 8.

8. The method of claim 1, wherein the predetermined ink density value is a measured ink density of a printed version of the corresponding word of bi-level data.

9. The method of claim 1, wherein the specified number of words is one.

10. The method of claim 1, wherein the generated contone data value is an average of the ink density values for the specified number of words.

11. The method of claim 1, further comprising storing in a memory device the contone data value and retrieving the contone data value when printing a sheet corresponding to the bi-level data.

12. The method of claim 11, wherein the memory device is a non-volatile memory device.

13. The method of claim 11, wherein the memory device is a magnetic disk.

14. A system for creating a printed sheet from bi-level data, comprising:

means for receiving bi-level data representing a signature;

a signature generator for creating a signature from the bi-level data;

a converter configured to read a specified number of words from the bi-level data, each word having a predetermined number of bits, obtain, for each word, a corresponding predetermined ink density value, and generate a contone data value from the ink density values obtained for the specified number of words; and a press configured to use the contone data value to set ink key values.

15. The system of claim 14, wherein the corresponding predetermined ink density value is obtained from a table using the corresponding word as an index into the table.

16. The system of claim 15, wherein the table includes a predetermined number of unique bit patterns and a same number of ink density values, each ink density value associated with one of the unique bit patterns and representing a measured ink density of a printed version of the one of the unique bit patterns.

17. The system of claim 16, wherein each one of the predetermined number of unique bit patterns is associated with exactly one of the ink density values.

18. The system of claim 16, wherein the measured ink density is generated by a densitometer.

19. The system of claim 16, wherein the predetermined number of unique bit patterns is $2^n$, where n is the number of bits in a word of bi-level data.

20. The system of claim 19, wherein n is 8.

21. The system of claim 14, wherein the predetermined ink density value is a measured ink density of a printed version of the corresponding word of bi-level data.

22. The system of claim 14, wherein the specified number of words is one.

23. The system of claim 14, wherein the generated contone data value is an average of the ink density values obtained for the specified number of words.

24. The system of claim 14, further comprising a memory device for storing the contone data value and retrieving the contone data value when printing a sheet corresponding to the bi-level data.

25. The system of claim 24, wherein the memory device is a non-volatile memory device.

26. The method of claim 24, wherein the memory device is a magnetic disk.

27. A computer program on a computer-readable medium for converting bi-level data to contone data for use in creating a printed sheet, the program comprising instructions to:

receive bi-level data;

read a specified number of words from the bi-level data, each word having a predetermined number of bits;

obtain, for each word, a corresponding predetermined ink density value; and generate a contone data value for the specified number of words from the specified corresponding predetermined ink density values.

28. The computer program of claim 27, wherein the corresponding predetermined ink density value is obtained from a table using the corresponding word of bi-level data as an index into the table.

29. The computer program of claim 28, wherein the table includes a predetermined number of unique bit patterns and a same number of ink density values, each ink density value associated with one of the unique bit patterns and representing a measured ink density of a printed version of the unique bit patterns.

30. The computer program of claim 29, wherein each one of the predetermined number of unique bit patterns is associated with exactly one of the ink density values.

31. The computer program of claim 27, wherein the predetermined ink density value is a measured ink density of a printed version of the corresponding word of bi-level data.

32. The computer program of claim 27, wherein the specified number of words is one.

* * * * *